United States Patent
Xu et al.

(10) Patent No.: US 11,490,410 B2
(45) Date of Patent: Nov. 1, 2022

(54) TIMING THRESHOLD FOR CROSS-CARRIER SCHEDULING WITH DIFFERENT SUBCARRIER SPACINGS

(71) Applicant: QUALCOMM Incorporated, San Diego, CA (US)

(72) Inventors: Huilin Xu, San Diego, CA (US); Peter Pui Lok Ang, San Diego, CA (US); Peter Gaal, San Diego, CA (US); Aamod Khandekar, San Diego, CA (US); Yuanning Yu, Santa Clara, CA (US); Ruhua He, San Diego, CA (US); Alexandros Manolakos, San Diego, CA (US); Tao Luo, San Diego, CA (US); Hongsan Sheng, San Diego, CA (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 114 days.

(21) Appl. No.: 16/948,485

(22) Filed: Sep. 21, 2020

(65) Prior Publication Data

US 2021/0100021 A1 Apr. 1, 2021

Related U.S. Application Data

(60) Provisional application No. 62/908,349, filed on Sep. 30, 2019.

(51) Int. Cl.
*H04W 72/12* (2009.01)
*H04W 72/04* (2009.01)

(52) U.S. Cl.
CPC ..... *H04W 72/1289* (2013.01); *H04W 72/042* (2013.01)

(58) Field of Classification Search
CPC .............. H04W 72/042; H04W 72/1289
(Continued)

(56) References Cited

U.S. PATENT DOCUMENTS

2019/0222357 A1* 7/2019 Huang ............. H04W 72/0446
2019/0342907 A1* 11/2019 Huang ............. H04L 5/0053
2021/0067205 A1* 3/2021 Manolakos ......... H04L 5/0044

OTHER PUBLICATIONS

"3rd Generation Partnership Project, Technical Specification Group Radio Access Network, NR, Physical Layer Procedures for Data (Release 15)", 3GPP Standard Technical Specification, 3GPP TS 38.214. 3rd Generation Partnership Project (3GPP), Mobile Competence Centre, 650, Route Des Lucioles, F-06921 Sophia-Antipolis Cedex, France, vol. RAN WG1, No. V15.7.0, Sep. 28, 2019 (Sep. 28, 2019), pp. 1-106, XP051785090, Retrieved from the Internet: URL: http://ftp.3gpp.org/Specs/archive/38_series/38.214/38214-f70.zip. 38214-f70.docx. [retrieved on Sep. 28, 2019] section 5 .1. 2 .1; p. 11 Section 5 .1. 5;p. 28-p. 29 section 5.2.1.5.1; p. 42-p. 44.
(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive, on a first carrier having a first subcarrier spacing (SCS), a scheduling indication via a physical downlink control channel (PDCCH) scheduling a downlink transmission on a second carrier having a second SCS. The UE may process the downlink transmission on the second carrier based at least in part on a delay between the PDCCH and the scheduled downlink transmission and a timing threshold having a basic term and an adjustment term. For example, the basic term may be based at least in part on a minimum delay between the PDCCH and the scheduled downlink transmission, and the adjustment term may be based at least in part on a processing time due to a difference between the
(Continued)

first SCS and the second SCS. Numerous other aspects are provided.

30 Claims, 14 Drawing Sheets

(58) Field of Classification Search
USPC .......................................................... 370/329
See application file for complete search history.

(56) References Cited

OTHER PUBLICATIONS

International Search Report and Written Opinion—PCT/US2020/070562—ISA/EPO—dated Dec. 1, 2020.
Nokia: et al., "Feature Lead Summary #3 on Cross-Carrier Scheduling with Different Numerologies", 3GPP Draft, 3GPP TSG RAN WG1 Meeting #97, R1-1907855, 7.2.13.2 Summary #3, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 17, 2019 (May 17, 2019), XP051740128, 18 pages, Retrieved from the Internet: URL: http://www.3gpp.org/ftp/tsg%5Fran/WG1%5FRL1/TSGR1%5F97/Docs/R1%2D1907855%2Ezip. [retrieved on May 17, 2019] section 2.4; p. 7-p. 8.
Spreadtrum Communications: "Discussion on Cross-Slot Scheduling for UE Power Saving", 3GPP Draft, R1-1908941, Discussion on Cross-Slot Scheduling for UE PowerSaving, 3rd Generation Partnership Project (3GPP), Mobile Competence Centre, 650, Route Des Lucioles, F-06921 Sophia-Antipolis, vol. RAN WG1, No. Prague, CZ, Aug. 26, 2019-Aug. 30, 2019, Aug. 17, 2019 (Aug. 17, 2019), XP051765547, 6 pages, Retrieved from the Internet: URL: http://www.3gpp.org/ftp/tsg_ran/WG1_RL1/TSGR1_98/Docs/R1-1908941.zip. [retrieved on Aug. 17, 2019] section 2.2; p. 2 p. 3.
ZTE Corporation: "Discussion on Cross-Carrier Scheduling with different Numerologies", 3GPP Draft; R1-1906420 Discussion on Cross-Carrier Scheduling with different Numerologies, 3rd Generation Partnership Project (3GPP), Mobile Competence Centre, 650, Route Des Lucioles ; F-06921 Sophia-Antipolis Cedex, France, vol. RAN WG1, No. Reno, USA; May 13, 2019-May 17, 2019 May 13, 2019, XP051727870, Retrieved from the Internet: URL:https://www.3gpp.org/ftp/tsg_ran/WG1_RL1/TSGR1_97/Docs/ [retrieved on May 13, 2019] Sect.s 3, 4, 6 pages.

* cited by examiner

TIMING THRESHOLD FOR CROSS-CARRIER SCHEDULING WITH DIFFERENT SUBCARRIER SPACINGS

CROSS-REFERENCE TO RELATED APPLICATION

This patent application claims priority to U.S. Provisional Patent Application No. 62/908,349, filed on Sep. 30, 2019, entitled "TIMING THRESHOLD FOR CROSS-CARRIER SCHEDULING WITH DIFFERENT SUBCARRIER SPACINGS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring a timing threshold for cross-carrier scheduling with different subcarrier spacings.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: receiving a scheduling indication via a physical downlink control channel (PDCCH) on a first carrier having a first subcarrier spacing (SCS), wherein the PDCCH schedules a downlink transmission on a second carrier having a second SCS; and processing the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission, and wherein the adjustment term is based at least in part on a processing time due to a difference between the first SCS and the second SCS.

In some aspects, a UE for wireless communication may include a memory and one or more processors operatively coupled to the memory. The memory and the one or more processors may be configured to: receive a scheduling indication via a PDCCH on a first carrier having a first SCS, wherein the PDCCH schedules a downlink transmission on a second carrier having a second SCS; and process the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission, and wherein the adjustment term is based at least in part on a processing time due to a difference between the first SCS and the second SCS.

In some aspects, a non-transitory computer-readable medium may store one or more instructions for wireless communication. The one or more instructions, when executed by one or more processors of a UE, may cause the one or more processors to: receive a scheduling indication via a PDCCH on a first carrier having a first SCS, wherein the PDCCH schedules a downlink transmission on a second carrier having a second SCS; and process the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission, and wherein the adjustment term is based at least in part on a processing time due to a difference between the first SCS and the second SCS.

In some aspects, an apparatus for wireless communication may include: means for receiving a scheduling indication via a PDCCH on a first carrier having a first SCS, wherein the PDCCH schedules a downlink transmission on a second carrier having a second SCS; and means for processing the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission, and wherein the adjustment term is based at least in part on a processing time due to a difference between the first SCS and the second SCS.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
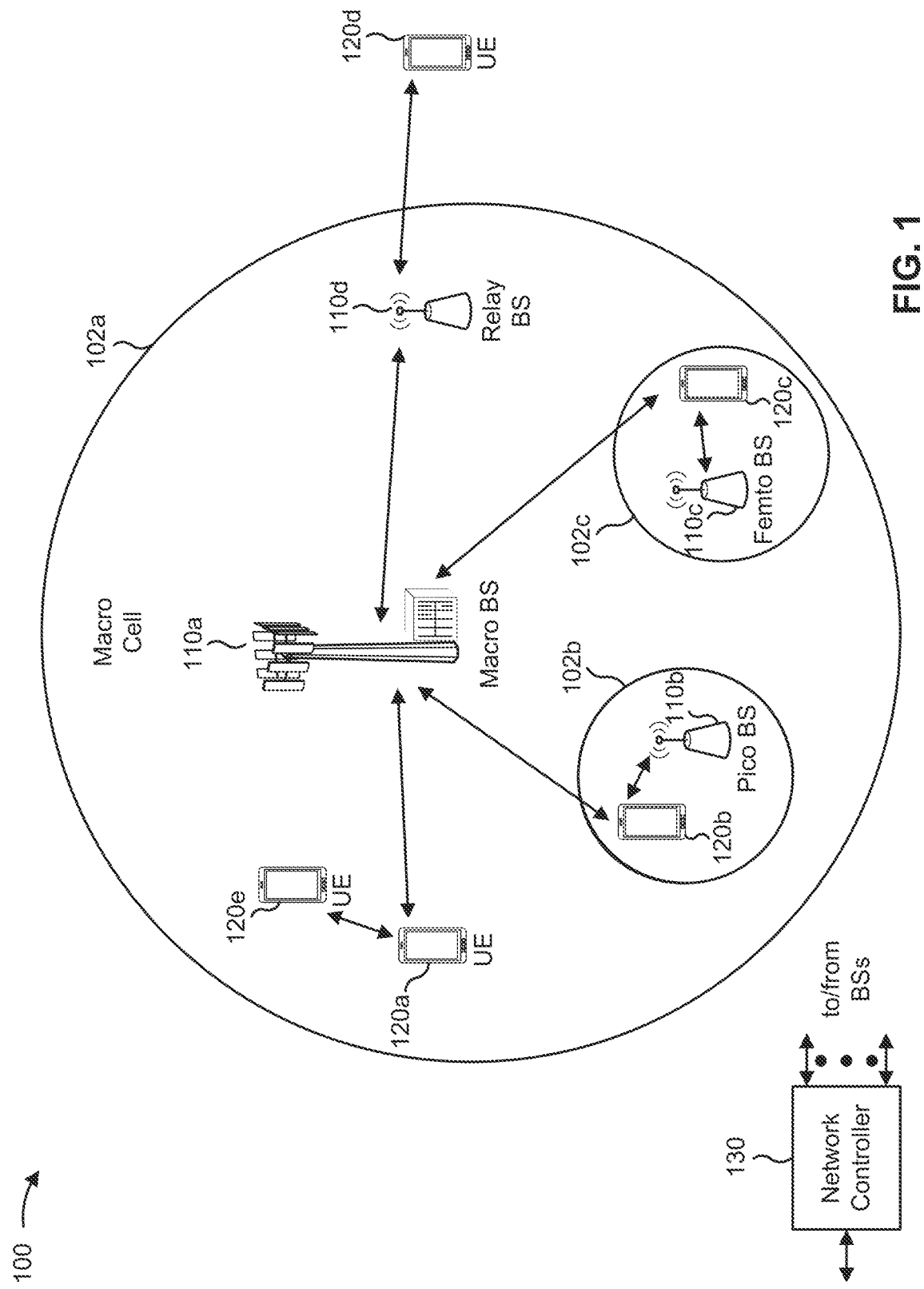
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
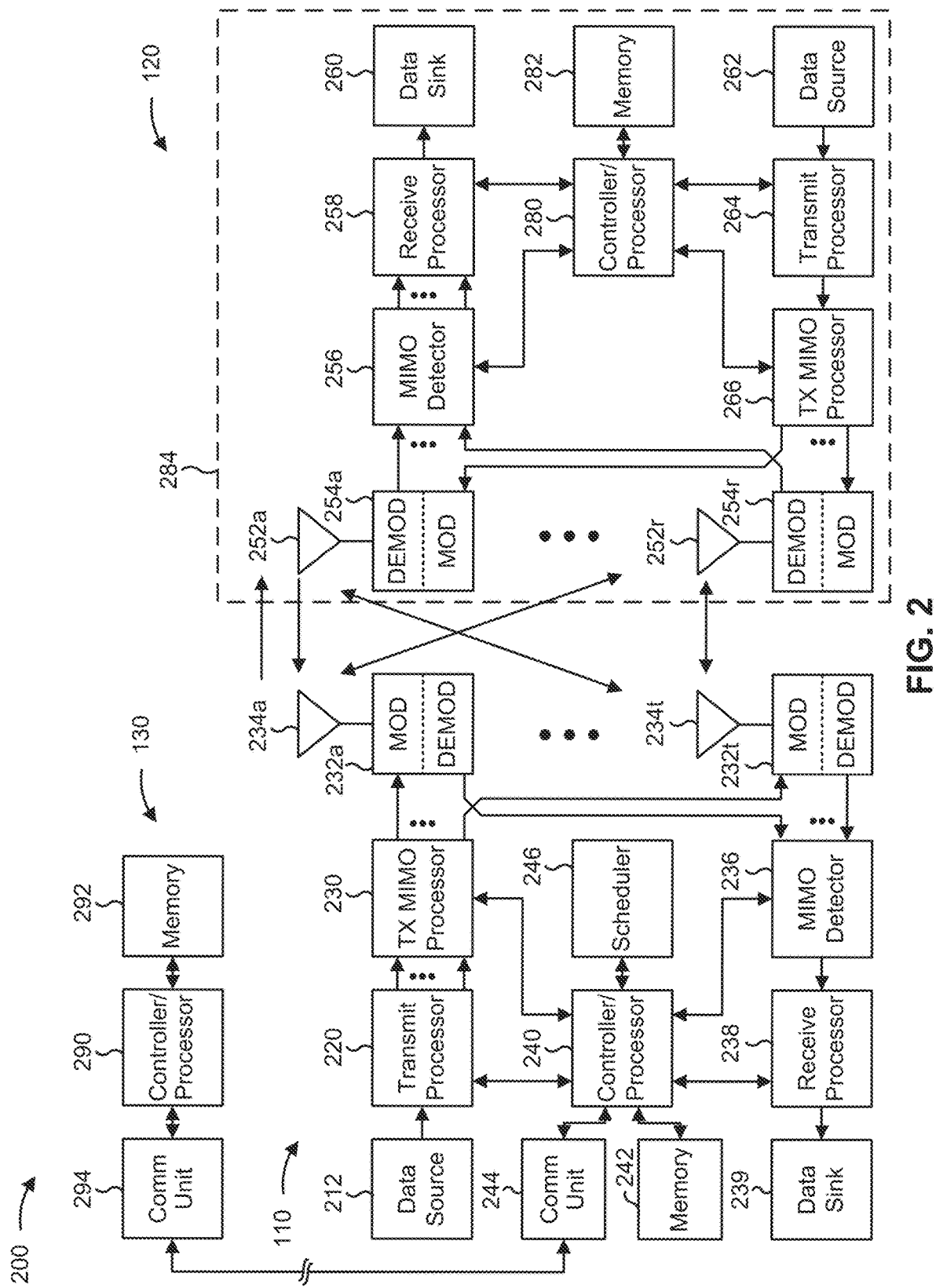
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with configuring a timing threshold for cross-carrier scheduling with different subcarrier spacings (SCS), as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, interpreting the instructions, and/or the like.

In some aspects, UE 120 may include means for receiving a scheduling indication via a physical downlink control channel (PDCCH) on a first carrier having a first SCS, wherein the PDCCH schedules a downlink transmission on a second carrier having a second SCS, means for processing the downlink transmission on the second carrier based at least in part on a delay between the PDCCH and the scheduled downlink transmission, and on a timing threshold that includes a basic term based at least in part on a minimum delay between the PDCCH and the scheduled downlink transmission and an adjustment term based at least in part on a processing time due to a difference between the first SCS and the second SCS, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
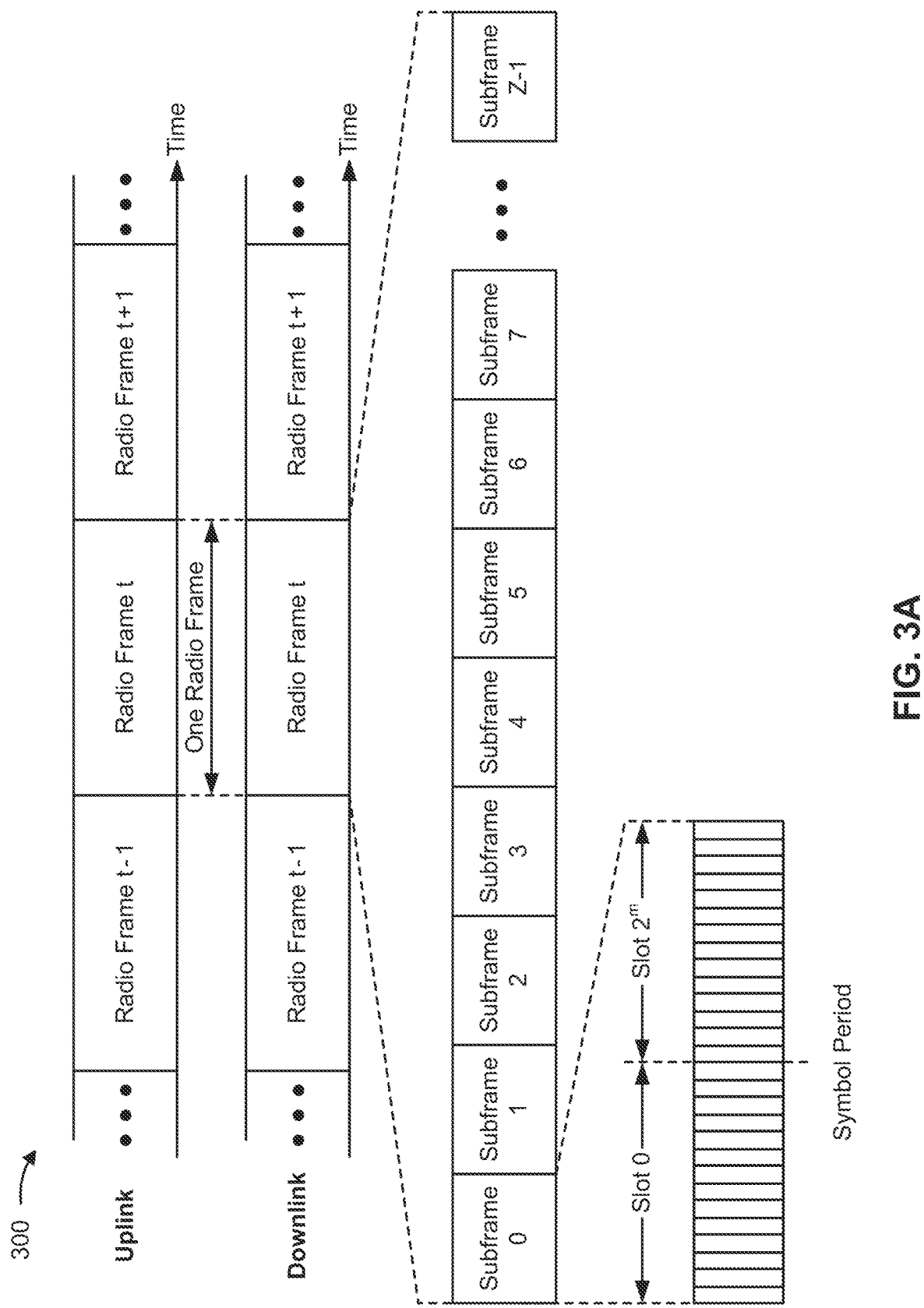
FIG. 3A is a diagram illustrating an example frame structure in a wireless network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
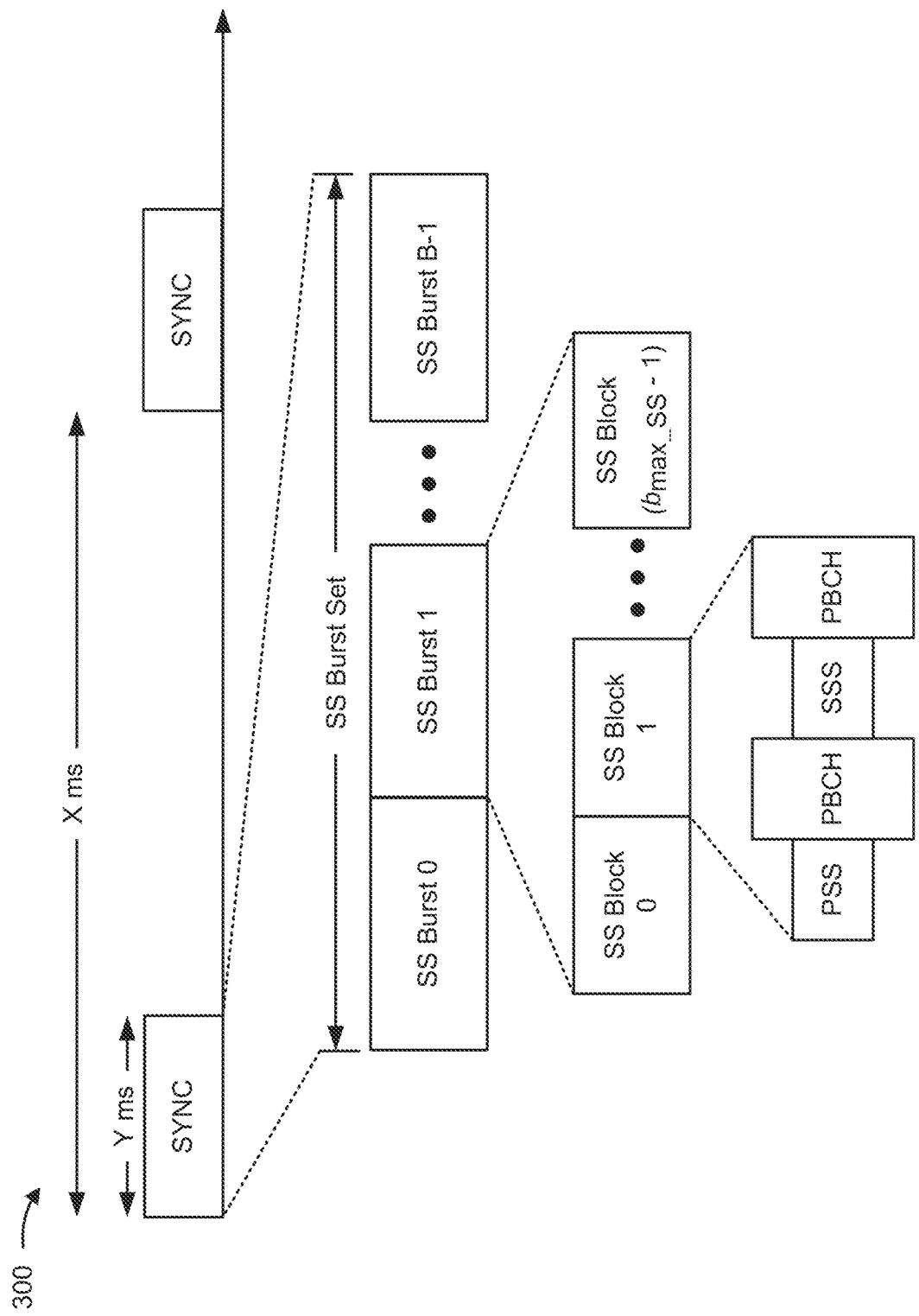
FIG. 3B is a diagram illustrating an example synchronization communication hierarchy in a wireless network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
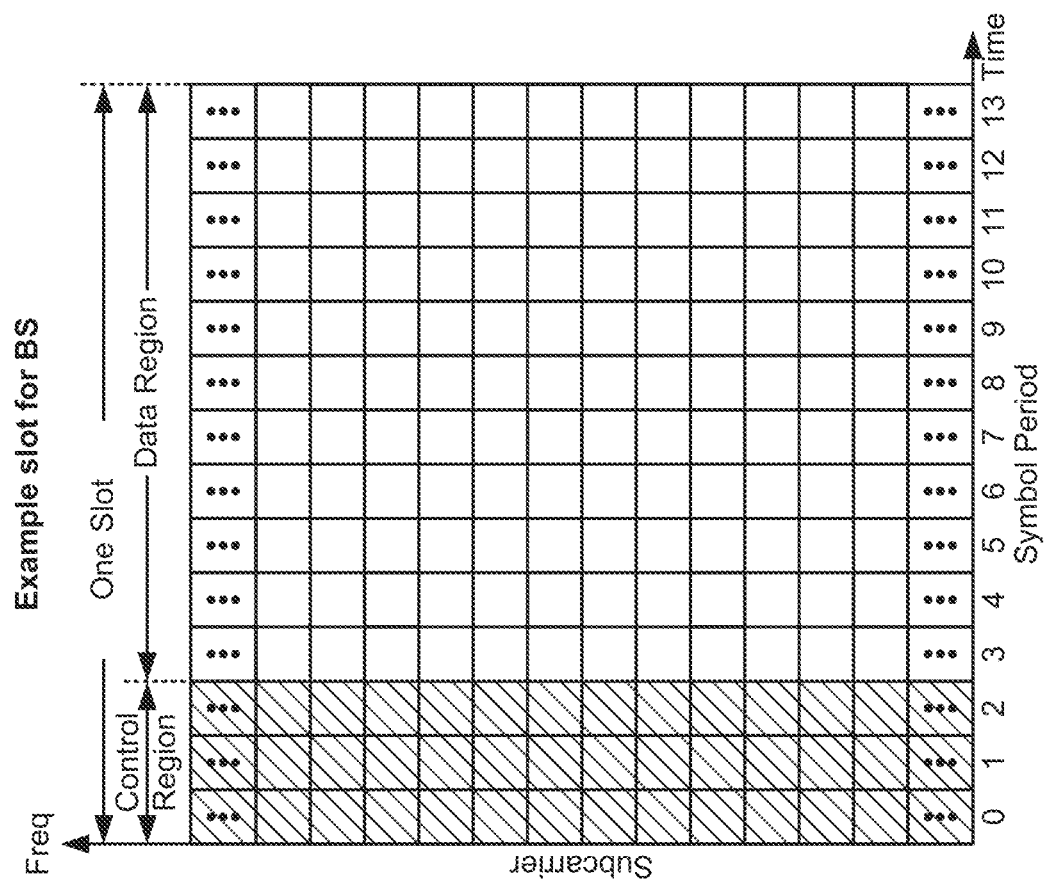
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a RSRQ, or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
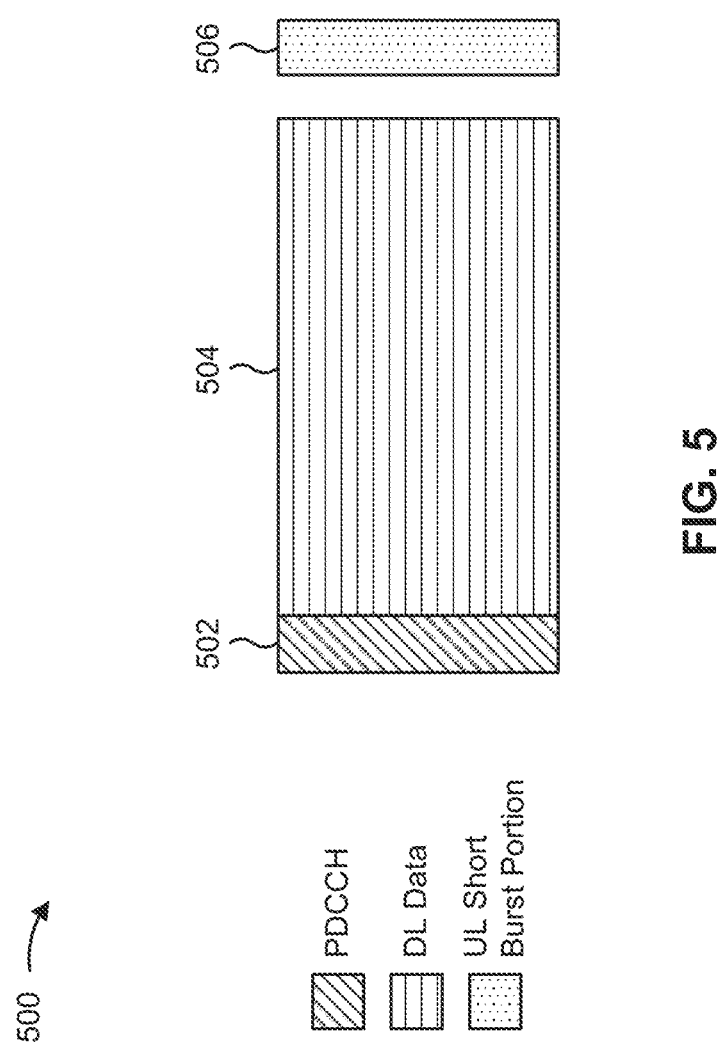
FIG. 5 is a diagram illustrating an example of a downlink-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an uplink (UL) short burst portion 506. The UL short burst portion 506 may sometimes be referred to as an uplink burst, an uplink burst portion, a common UL burst, a short burst, an uplink short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
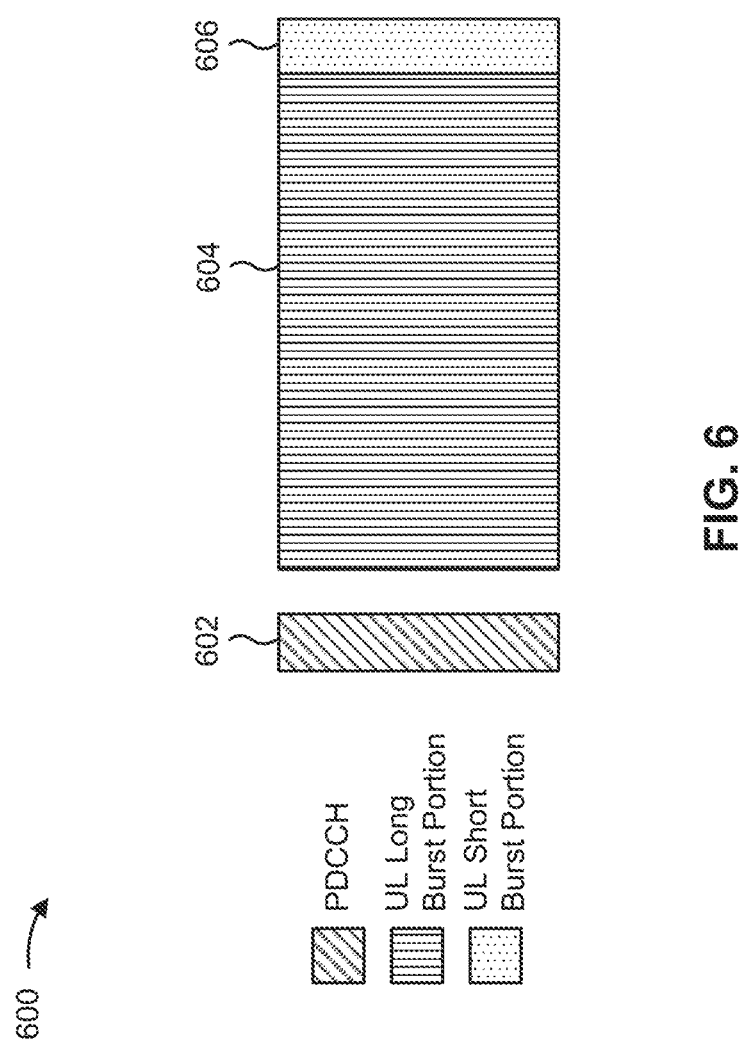
FIG. 6 is a diagram illustrating an example of an uplink-centric slot, in accordance with various aspects of the present disclosure.

FIG. 6 is a diagram 600 showing an example of an uplink (UL)-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an uplink short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., a first UE) to another subordinate entity (e.g., a second UE) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

Figure 7:
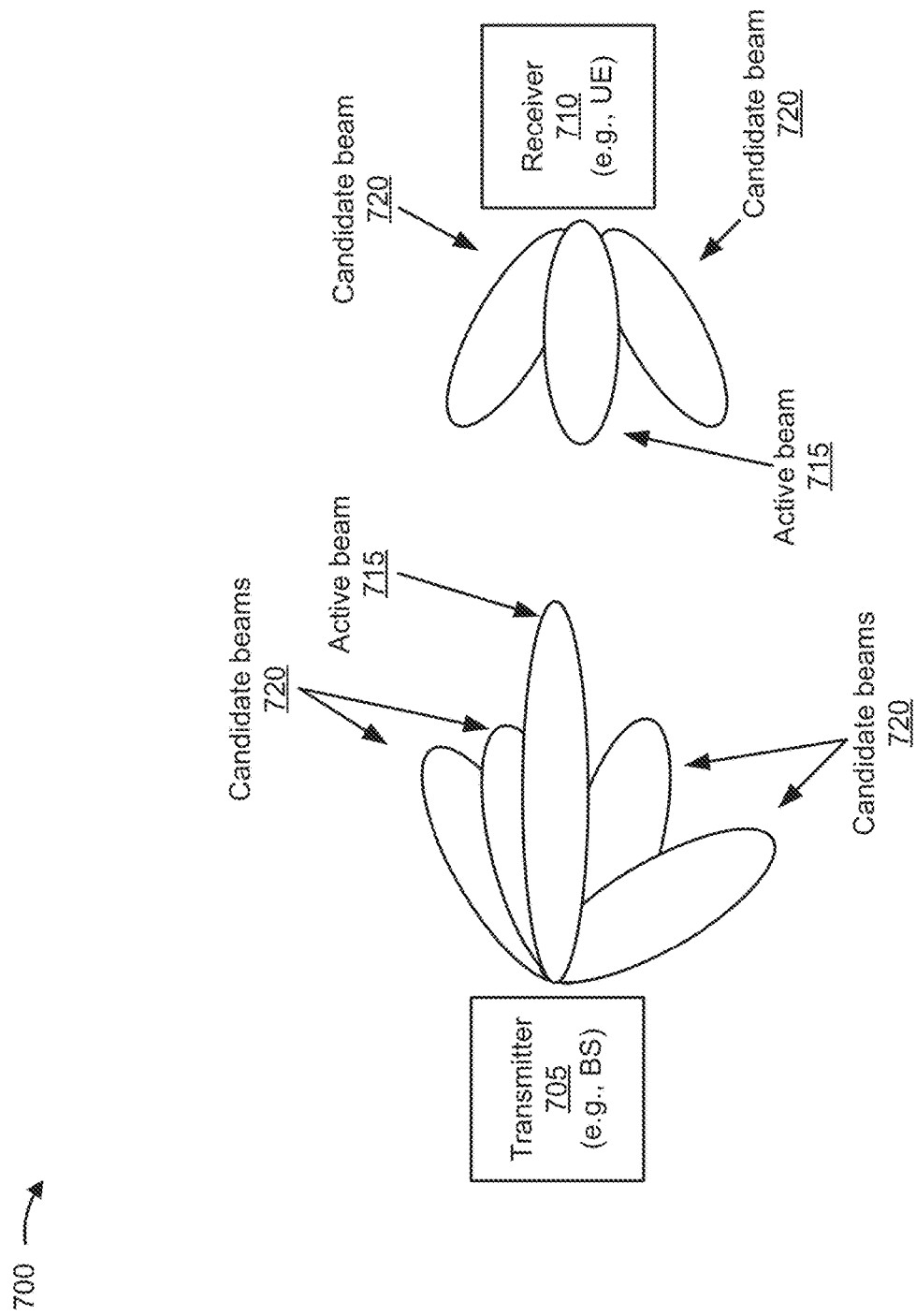
FIG. 7 illustrates an example of beam switching, in accordance with various aspects of the present disclosure.

FIG. 7 is a diagram illustrating an example 700 relating to beam switching, in accordance with various aspects of the present disclosure. FIG. 7 shows an example of wireless communication via one or more beams.

As shown in FIG. 7, a transmitter 705 (e.g., shown as a base station (such as base station 110) in example 700) may communicate with a receiver 710 (e.g., shown as a UE (such as UE 120) in example 700) using one or more active beams 715. In some aspects, the transmitter 705 and the receiver 710 may also be capable of communicating via one or more candidate beams 720. In some aspects, an active beam 715 may be selected from a set of candidate beams 720 by comparing beam parameters (e.g., an RSRP, an RSRQ, an RSSI, and/or the like) of the set of candidate beams 720. For example, an active beam 715 may be the beam that has the best beam parameters among all beams in the set of candidate beams 720. In some aspects, the beams may operate in a millimeter wave radio frequency band.

In some aspects, if the active beam 715 experiences a failure, or network conditions change such that another candidate beam 720 has one or more better beam parameters than the active beam 715, then the transmitter 705 and the receiver 710 may perform a beam switch procedure to switch away from the active beam 715 and to a candidate beam 720. After switching beams, the transmitter 705 and the receiver 710 may no longer communicate via the previously active beam, and may communicate via the newly activated candidate beam (e.g., which becomes the active beam).

In some aspects, to switch away from an active beam 715, the transmitter 705 may transmit a beam switch command to instruct the receiver 710 to switch beams. In some aspects, the beam switch command may indicate a beam index for a beam to be activated, a timing for the switch, and/or the like. For example, in addition to including a beam switch command, a PDCCH transmitted using the original active beam 715 may schedule a downlink transmission (e.g., a PDSCH, a CSI reference signal (CSI-RS), and/or the like) on the candidate beam 720 to be newly activated. In order for the receiver 710 to receive the scheduled downlink transmission, a minimum scheduling delay threshold may be defined between the PDCCH and the scheduled downlink transmission to account for PDCCH processing time (e.g., a time for the receiver 710 to decode and parse the PDCCH), a time for the receiver 710 to switch radio frequency (RF) circuits, a potential downlink timing difference between a scheduling cell (e.g., where the PDCCH is received) and a scheduled cell (e.g., where the downlink transmission is received) in cross-carrier scheduling cases. However, in some cross-carrier scheduling cases, the scheduling cell and the scheduled cell may be associated with different subcarrier spacings. In this case, the minimum scheduling delay threshold may need to be adjusted to account for additional PDCCH processing time and/or the like due to the timing difference between the SCS in the scheduling cell and the SCS in the scheduled cell.

As indicated above, FIG. 7 is provided as an example. Other examples may differ from what is described with respect to FIG. 7.

FIGS. 8A-8D are diagrams illustrating examples 800 of configuring a timing threshold for cross-carrier scheduling with different SCS, in accordance with various aspects of the present disclosure. For example, as described herein, cross-carrier scheduling with different SCS may generally occur where a scheduling cell has a first SCS and a scheduled cell has a second SCS that differs from the first SCS. In some aspects, as described herein, a PDCCH transmitted on a scheduling cell may include a scheduling indication to schedule a PDSCH on a scheduled cell, to trigger an aperiodic CSI-RS on a scheduled cell, and/or the like. In the case where the PDCCH triggers an aperiodic CSI-RS, the aperiodic CSI-RS may generally be equivalent to a dynamically triggered CSI-RS, as a CSI-RS that is dynamically triggered by a PDCCH is an aperiodic CSI-RS. Additionally, or alternatively, in some aspects, the scheduling indication may indicate a beam switch operation on the scheduled cell, as described in further detail below.

Figure 8A:
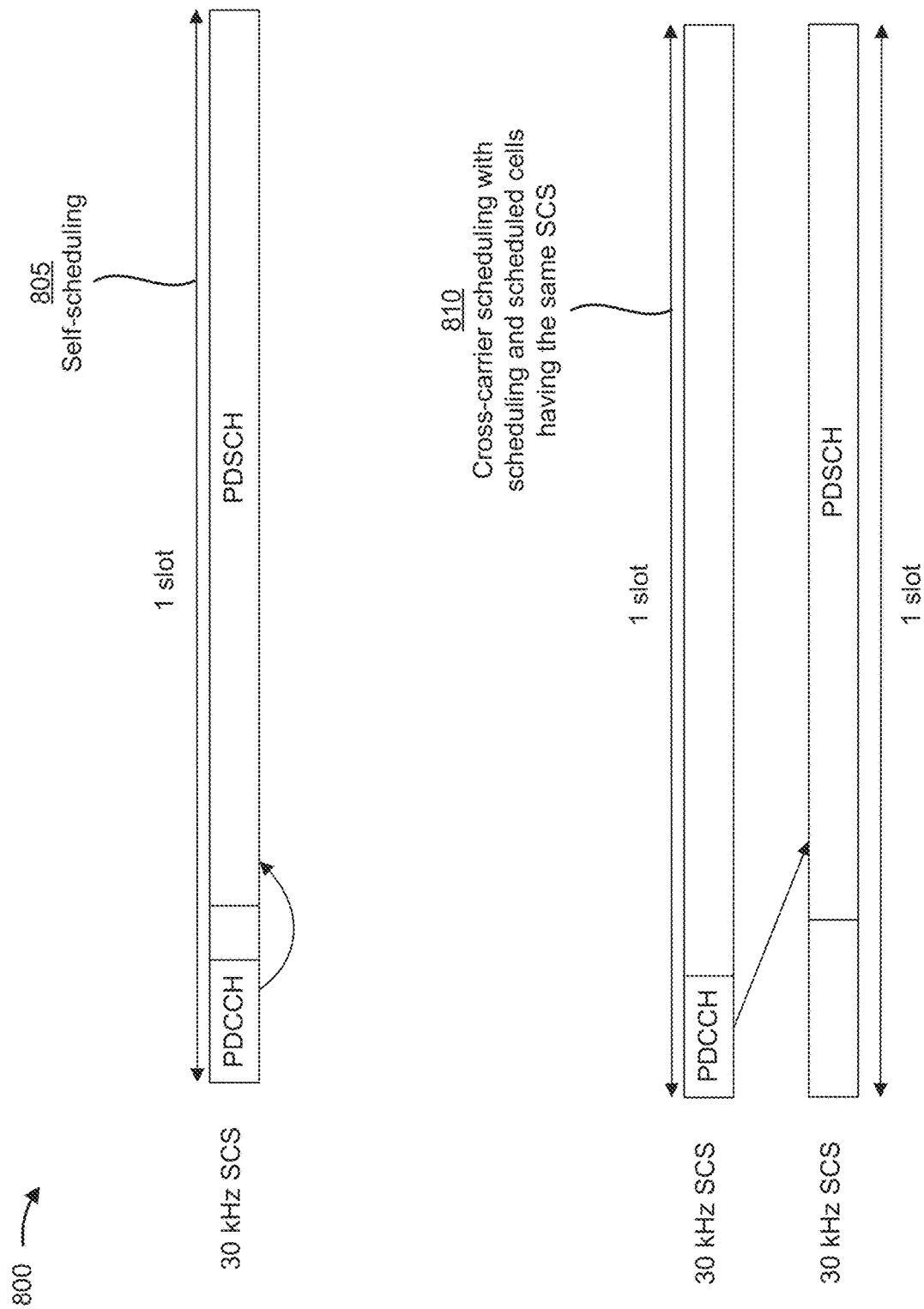
FIGS. 8A-8D are diagrams illustrating examples associated with configuring a timing threshold for cross-carrier scheduling with different subcarrier spacings, in accordance with various aspects of the present disclosure.

As shown in FIG. 8A, and by reference number 805, in an example of self-scheduling a PDCCH transmitted to a UE on a first carrier may include a scheduling indication to schedule a downlink transmission (e.g., a PDSCH, an aperiodic CSI-RS, and/or the like) on the same carrier. In the example shown by reference number 805, the scheduling cell (e.g., the carrier on which the PDCCH is received) and the scheduled cell (e.g., the carrier on which the downlink transmission is scheduled) are the same and therefore have the same SCS. Furthermore, in some aspects, the scheduling indication may include an indication to perform a beam switch operation.

As further shown in FIG. 8A, and by reference number 810, in an example of cross-scheduling with the same SCS, a PDCCH transmitted to a UE on a first carrier may include a scheduling indication to schedule a downlink transmission (e.g., a PDSCH, an aperiodic CSI-RS, and/or the like) on a second carrier. In some aspects, the scheduling indication may further include an indication to perform a beam switch operation. In the example shown by reference number 810, the scheduling cell (e.g., the carrier on which the PDCCH is received) and the scheduled cell (e.g., the carrier on which the downlink transmission is scheduled) have the same SCS. For example, as shown in FIG. 8A, the first carrier and the second carrier each have a 30 kHz SCS, whereby a slot on the first carrier and a slot on the second carrier have an equal slot duration.

Figure 8B:
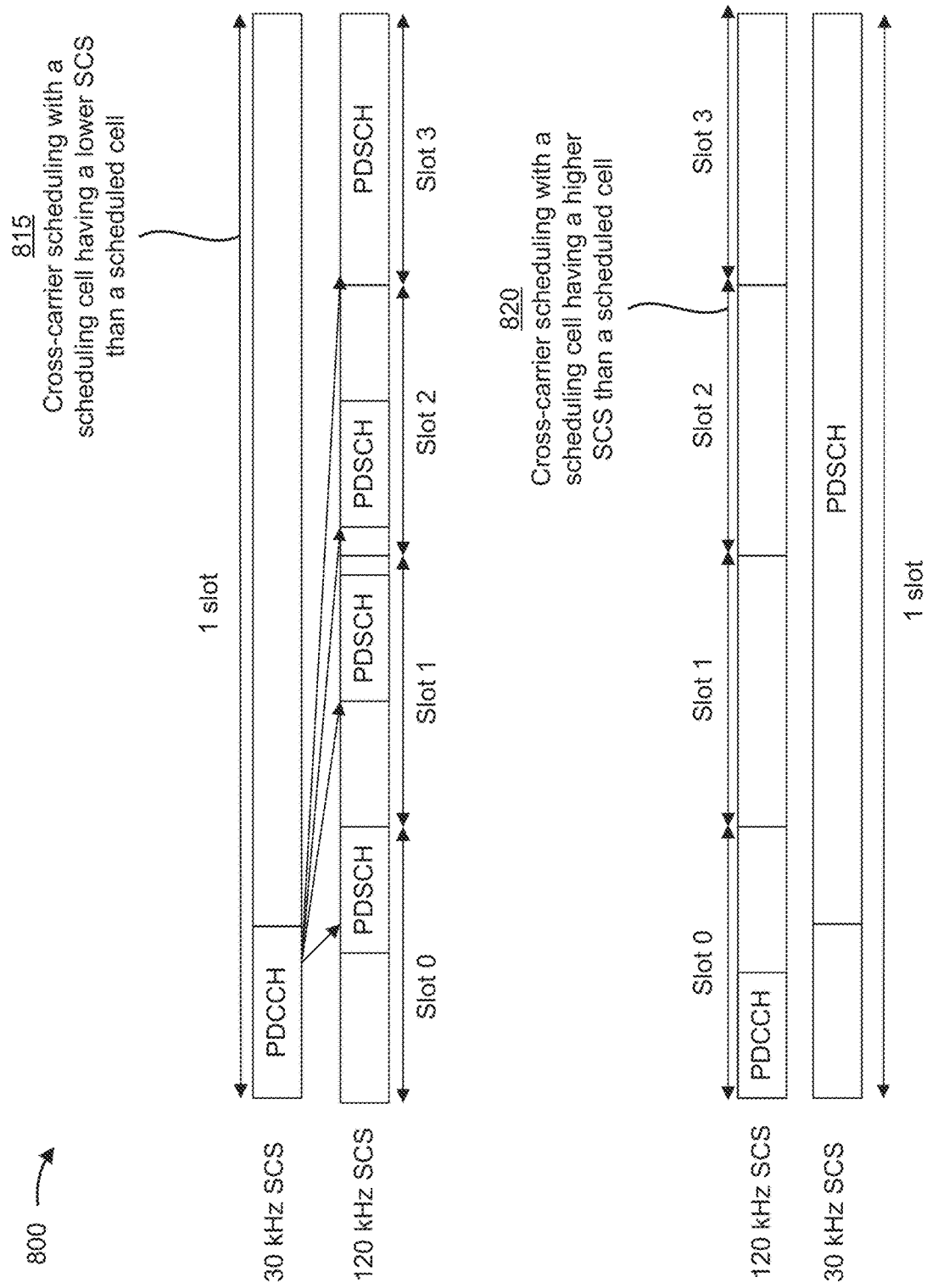

As shown in FIG. 8B, and by reference number 815, in an example of cross-scheduling with different SCS, a PDCCH transmitted to a UE on a first carrier that has a first SCS may include a scheduling indication to schedule a downlink transmission (e.g., a PDSCH, an aperiodic CSI-RS, and/or the like) on a second carrier that has a second SCS. In some aspects, the scheduling indication may further include an indication to perform a beam switch operation. In the example shown by reference number 815, the first SCS of the scheduling cell (e.g., the carrier on which the PDCCH is received) is lower than the second SCS of the scheduled cell (e.g., the carrier on which the downlink transmission is scheduled). For example, as shown by reference number 815, the first carrier has a 30 kHz SCS and the second carrier has a 120 kHz SCS, whereby a duration of one slot on the first carrier equals a duration of four consecutive slots on the second carrier.

As further shown in FIG. 8B, and by reference number 820, in another example of cross-scheduling with different SCS, a PDCCH transmitted to a UE on a first carrier that has a first SCS may include a scheduling indication to schedule a downlink transmission (e.g., a PDSCH, an aperiodic CSI-RS, and/or the like) on a second carrier that has a second SCS. In some aspects, the scheduling indication may further include an indication to perform a beam switch operation. In the example shown by reference number 820, the first SCS of the scheduling cell (e.g., the carrier on which the PDCCH is received) is higher than the second SCS of the scheduled cell (e.g., the carrier on which the downlink transmission is scheduled). For example, as shown by reference number 820, the first carrier has a 120 kHz SCS and the second carrier has a 30 kHz SCS, whereby a duration of one slot on the second carrier equals a duration of four consecutive slots on the first carrier.

In some aspects, as mentioned above, the downlink transmission that is scheduled by the scheduling indication contained in the PDCCH may be a PDSCH transmission, an aperiodic CSI-RS, and/or the like. In general, as mentioned above, a minimum scheduling delay threshold is generally defined between the PDCCH and reception of the scheduled downlink transmission in order to account for one or more factors related to a PDCCH processing (e.g., decoding and parsing) time, a time for the UE to switch RF circuits (if necessary), a potential downlink timing difference between the scheduling cell where the PDCCH is received and the scheduled cell where the downlink transmission is to be received in cross-carrier scheduling cases (especially where the scheduling cell and the scheduled cell have different SCS).

Figure 8C:
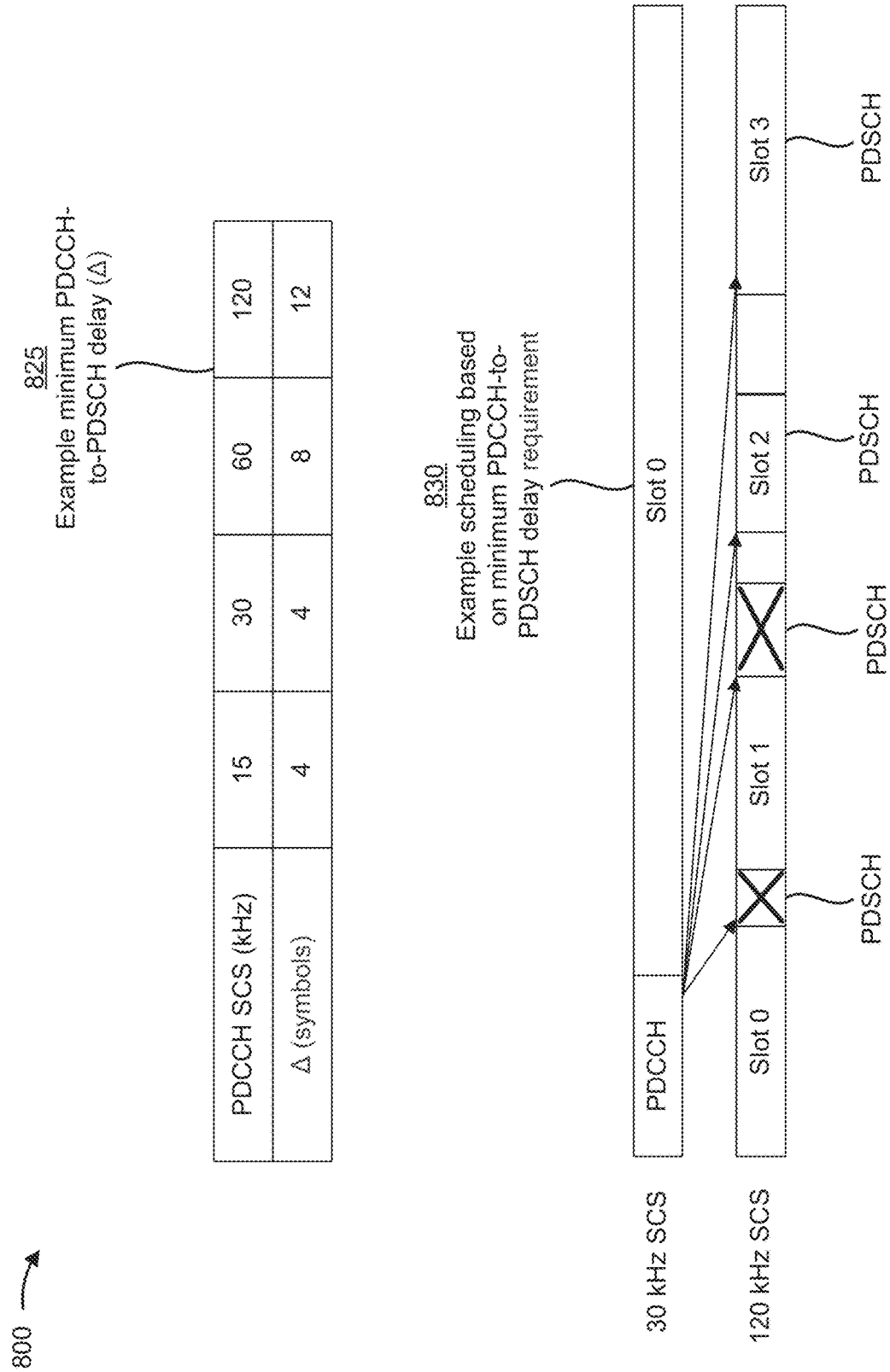

Accordingly, as shown in FIG. 8C, and by reference number 825, a minimum PDCCH-to-PDSCH delay may be defined for cross-carrier scheduling cases where the SCS associated with the scheduling cell is different from the SCS associated with the scheduled cell. In general, the minimum PDCCH-to-PDSCH delay may be defined as a quantity of symbols, which is based at least in part on the SCS of the scheduling cell where the PDCCH is received, counting from the end of a last symbol of the PDCCH to the beginning of the first symbol of the scheduled downlink transmission. For each SCS of the scheduling cell, the same minimum delay is defined for different cases (e.g., where the PDCCH is monitored in the same span in each slot in the first three symbols of the slot, where the PDCCH is monitored in the same span in each slot with at least one symbol not within the first three symbols of the slot, where the PDCCH is monitored in the same pattern of multiple (e.g., >1) spans in each slot, and/or the like). In cases where the UE receives a PDCCH that triggers an aperiodic CSI-RS, the UE may reference a rule to determine whether the UE is expected to receive the aperiodic CSI-RS. For example, in some cases, the UE may not be expected to receive the aperiodic CSI-RS (e.g., if a PDCCH-to-CSI-RS delay is smaller than a first timing threshold). If the UE is expected to receive the CSI-RS and the PDCCH additionally contains a beam switch indication, the UE may decide whether the CSI-RS can be received based on an indicated beam (e.g., where the PDCCH-to-CSI-RS delay is greater than or equal to a second timing threshold defined for cases where the PDCCH triggers an aperiodic CSI-RS and includes an indication to perform a beam switching operation). Alternatively, the UE may receive the CSI-RS based on a default beam that can be different than the indicated beam (e.g., where the PDCCH-to-CSI-RS delay is less than the second timing threshold defined for the cases where the PDCCH triggers an aperiodic CSI-RS and includes an indication to perform a beam switching operation).

Accordingly, referring to FIG. 8C, reference number 825 illustrates an example minimum PDCCH-to-PDSCH (and/or CSI-RS) delay in units of symbol durations of the scheduling cell for different possible SCS associated with the scheduling cell where the PDCCH is received. For example, the minimum PDCCH-to-PDSCH delay may be four (4) in cases where the SCS associated with the scheduling cell is 15 kHz or 30 kHz, eight (8) in cases where the SCS associated with the scheduling cell is 60 kHz, or twelve (12) in cases where the SCS associated with the scheduling cell is 120 kHz. In some aspects, in cases where the SCS associated with the scheduling cell is lower than the scheduled cell (e.g., the scheduling cell has a 30 kHz SCS and the scheduled cell has a 120 kHz SCS), the minimum PDCCH-to-PDSCH delay may be further quantized to a next slot boundary on the scheduled cell (e.g., using a granularity of a slot duration on the scheduled cell). For example, in FIG. 8C, reference number 830 illustrates an example showing that a PDSCH cannot be scheduled in the first two occasions after the PDCCH due to the minimum PDCCH-to-PDSCH delay requirement.

In some aspects, a UE may be further configured to monitor the PDCCH in accordance with one or more span pattern configurations. For example, the UE may send capability signaling (e.g., to a base station) to indicate whether the UE supports PDCCH monitoring in one or multiple spans in a slot. For example, if the UE monitors only one span in a slot, a span may contain three (3) consecutive OFDM symbols in the slot, and the UE may monitor all PDCCHs in the same span. In another example, if the UE can monitor multiple spans in a slot, each span may have a length up to Y consecutive OFDM symbols of a slot, and there may be a minimum time separation of X OFDM symbols (including the cross-slot boundary case) between the start of two spans, which do not overlap. Furthermore, every span is contained in a single slot, and the same span pattern repeats in every slot. Although a separation between consecutive spans within and across slots may be unequal, all spans generally satisfy the same (X, Y) limit. Further, each PDCCH monitoring occasion is fully contained in one span.

Figure 8D:
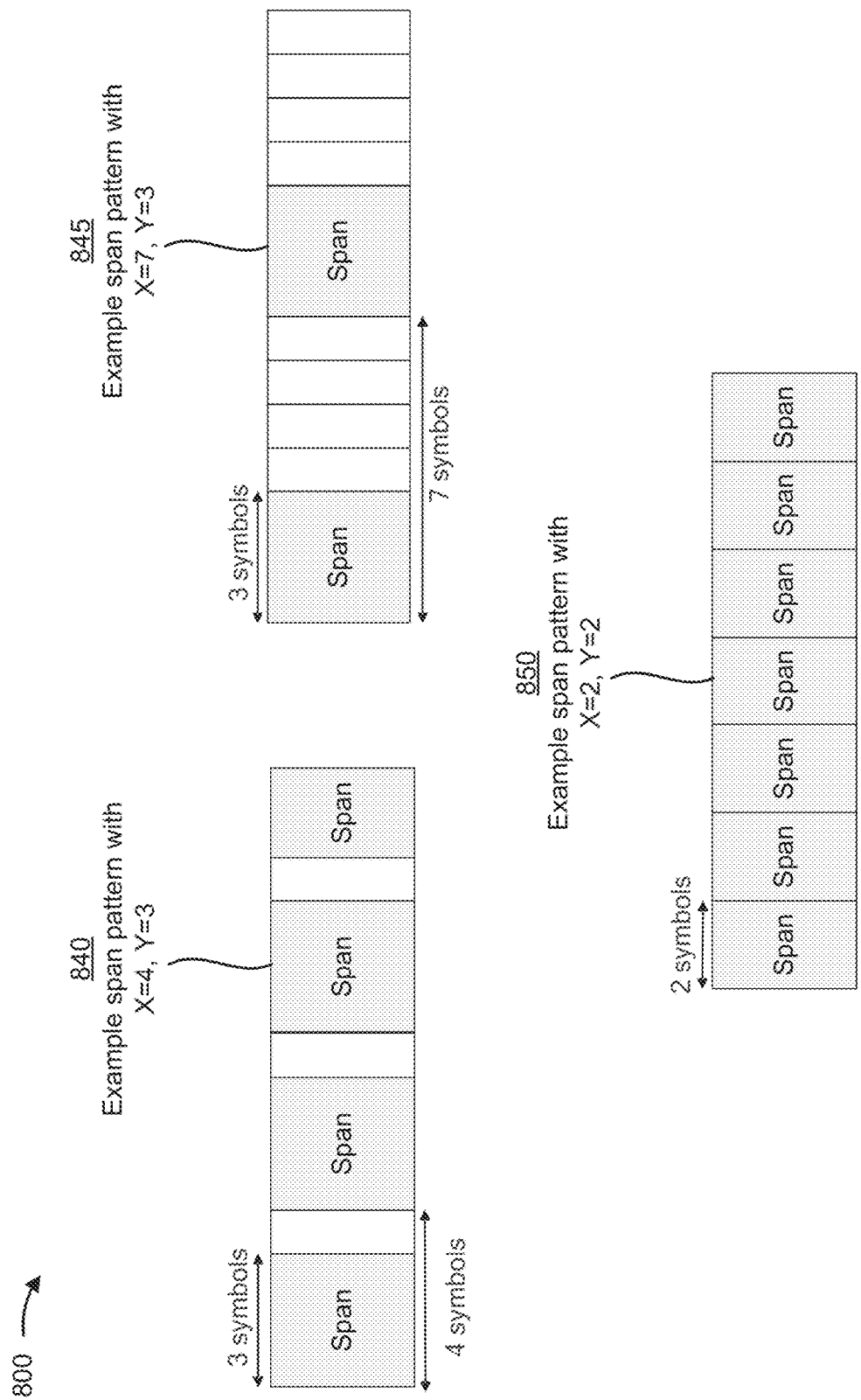

For example, FIG. 8D illustrates various example span patterns, where currently supported candidate value sets for (X, Y) include a first set including span pattern (7, 3), a second set including span patterns (4, 3) and (7, 3), and a third set including span patterns (2, 2), (4, 3), and (7, 3). For example, as shown by reference number 840, in a span pattern where X=4 and Y=3, a span duration is three symbols and an inter-span distance is four symbols. In another example, as shown by reference number 845, in a span pattern where X=7 and Y=3, the span duration is again three symbols but the inter-span distance (e.g., a number of symbols between a start of a first span and a start of a next span) is seven symbols. In another example, as shown by reference number 850, in a span pattern where X=2 and Y=2, the span duration is two symbols and the inter-span distance is two symbols.

In some aspects, in order to determine a suitable span pattern, a bitmap b(l), 0≤l≤13 is generated, where b(l)=1 if symbol l of any slot is part of a monitoring occasion, and b(l)=0 otherwise. In some aspects, the first span in the span pattern begins at the smallest l for which b(l)=1, and the next span in the span pattern begins at the smallest/not included in the previous span(s) for which b(l)=1. The span duration is max{maximum value of all CORESET durations, minimum value of Y in the UE reported candidate value}, except that the last span in a slot can potentially have a shorter duration. A PDCCH monitoring configuration meets UE capability limitations if the span arrangement satisfies the gap separation for at least one (X, Y) in the UE reported candidate value set in every slot, including cross-slot boundary.

In some aspects, when using the minimum PDCCH-to-PDSCH delay, the PDCCH span pattern, and/or the like to determine a timing threshold to be applied in cases of cross-carrier scheduling with different SCS, a scaling factor may be applied to convert the minimum PDCCH-to-PDSCH delay, the number of OFDM symbols in the PDCCH span, and/or the like to a quantity of OFDM symbols associated with the scheduled cell (where the PDSCH and/or aperiodic CSI-RS is to be received). For example, in some aspects, a scaling factor of $$\frac{2^{\mu_{PDSCH}}}{2^{\mu_{PDCCH}}}$$

may be applied to convert a minimum PDCCH-to-PDSCH delay or a number of OFDM symbols in the span of the PDCCH based on the SCS of the scheduling cell to a number of OFDM symbols based on the SCS of the scheduled cell. Additionally, or alternatively, a scaling factor $$\frac{2^{\mu_{CSIRS}}}{2^{\mu_{PDCCH}}}$$

may be applied to convert the minimum PDCCH-to-PDSCH delay or a number of OFDM symbols in the span of the PDCCH based on the SCS of the scheduling cell to the number of OFDM symbols based on the SCS of the scheduled cell. In these examples, $2^{\mu_{PDSCH}}$, $2^{\mu_{CSIRS}}$, $2^{\mu_{PDCCH}}$ may represent the SCS for the scheduled cell associated with the PDSCH, the scheduled cell associated with the CSI-RS, and the scheduling cell associated with the PDCCH, where μ is [0,1,2,3] for SCS=[15,30,60,120] kHz.

As indicated above, FIGS. 8A-8D are provided as one or more examples. Other examples may differ from what is described with respect to FIGS. 8A-8D.

Figure 9:
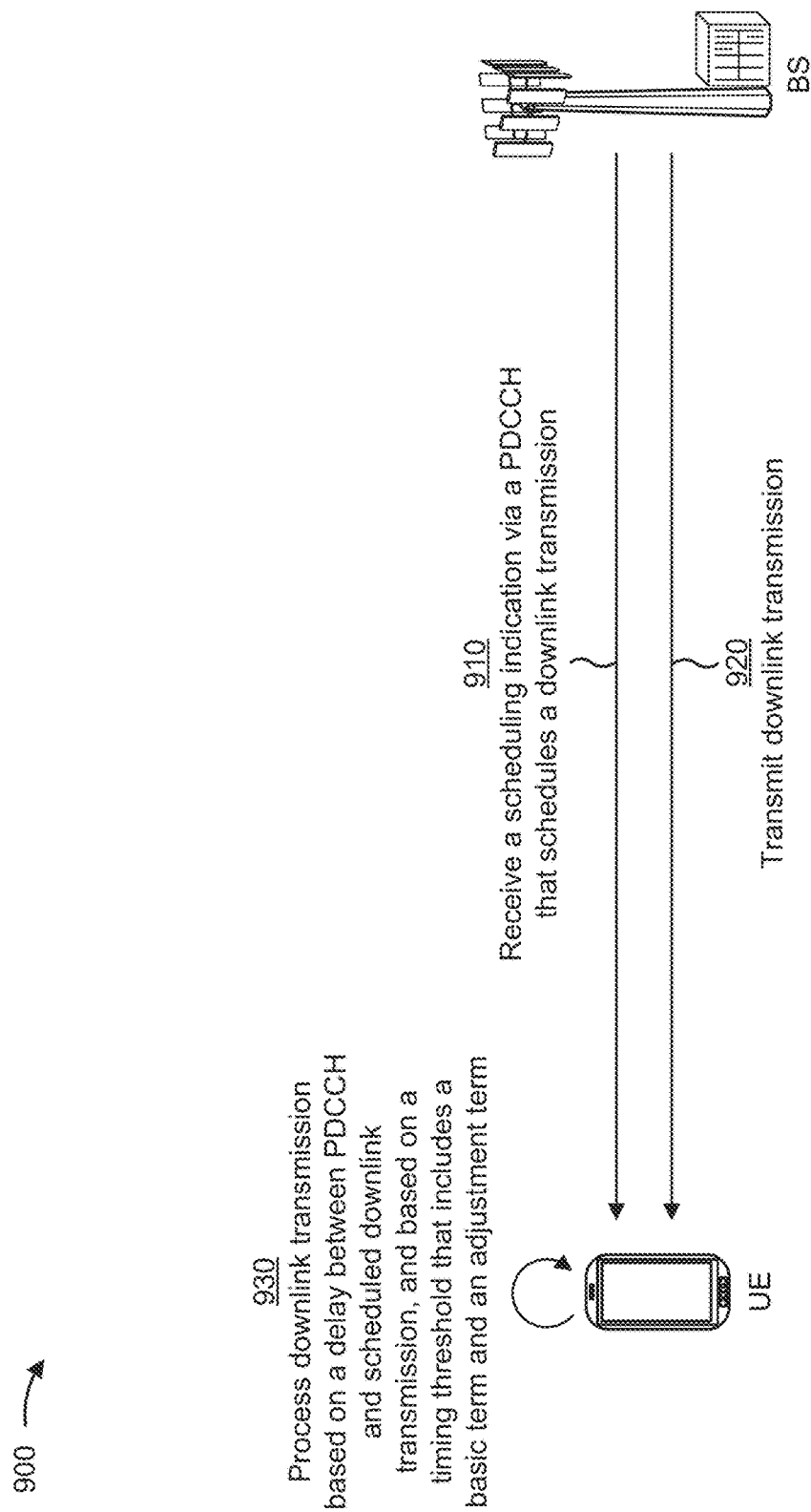
FIG. 9 is a diagram illustrating an example associated with configuring a timing threshold for cross-carrier scheduling with different subcarrier spacings, in accordance with various aspects of the present disclosure.

FIG. 9 is a diagram illustrating an example 900 of configuring a timing threshold for cross-carrier scheduling with different SCS, in accordance with various aspects of the present disclosure. As shown in FIG. 9, example 900 includes a base station (e.g., base station 110) in communication with a UE (e.g., UE 120) in a wireless network (e.g., wireless network 100). In some aspects, the base station and the UE may communicate on a wireless access link, which may include an uplink and a downlink.

As shown in FIG. 9, and by reference number 910, the base station may transmit, and the UE may receive, a scheduling indication via a PDCCH that schedules a downlink transmission. In some aspects, as described herein, the PDCCH may be received on a first carrier that has a first SCS, and the downlink transmission (e.g., a PDSCH and/or an aperiodic CSI-RS) may be scheduled on a second carrier that has a second SCS. Accordingly, as further shown by reference number 920, the base station may transmit the scheduled downlink transmission on the second carrier.

As further shown in FIG. 9, and by reference number 930, the UE may process the downlink transmission based at least in part on a delay between the PDCCH and the scheduled downlink transmission, and further based at least in part on a timing threshold that includes a basic term and an adjustment term, where the timing threshold is a summation of the basic term and the adjustment term. In some aspects, as described herein, the basic term may be based at least in part on a minimum delay between the PDCCH and the scheduled downlink transmission (e.g., a minimum PDCCH-to-PDSCH delay, as described above with reference to FIGS. 8A-8D), and the adjustment term may be based at least in part on a UE processing time that is due to a difference in slot durations associated with the first SCS and the second SCS. The timing threshold and the delay may generally be defined as a number of symbols based on the SCS on the second carrier associated with the scheduled downlink transmission, and the values of the timing threshold and the delay may depend on whether the scheduled downlink transmission is a PDSCH or an aperiodic CSI-RS. Alternatively, in some cases, the timing threshold and the delay may have a particular value regardless of whether the scheduled downlink transmission is a PDSCH or an aperiodic CSI-RS, or elements of the timing threshold (e.g., the basic term and/or the adjustment term) may depend on whether the scheduled downlink transmission is a PDSCH or an aperiodic CSI-RS.

For example, in cases of cross-carrier scheduling where the SCS on the first carrier associated with the PDCCH differs from the SCS on the second carrier associated with the downlink transmission scheduled by the PDCCH, the basic term of the timing threshold may correspond to a value associated with a parameter that is defined for self-scheduling (e.g., where the PDCCH and the scheduled downlink transmission are on the same carrier) or cross-carrier scheduling where a scheduling cell and a scheduled cell have an equal SCS (e.g., where the PDCCH and the scheduled downlink transmission are on different carriers that have the same SCS). For example, in cases where the scheduled downlink transmission is a PDSCH, the basic term of the timing threshold may correspond to a value associated with a timeDurationForQCL parameter that defines a minimum number of symbols that the UE requires to perform PDCCH reception and apply spatial QCL information received in downlink control information (DCI) for PDSCH processing. Alternatively, in cases where the scheduled downlink transmission is an aperiodic CSI-RS, the basic term of the timing threshold may correspond to a value associated with a beamSwitchTiming parameter that defines a minimum number of symbols between DCI triggering an aperiodic CSI-RS and transmission of the aperiodic CSI-RS, in which case the number of symbols is measured from the last symbol containing the indication to the first symbol of the aperiodic CSI-RS. Alternatively, in some aspects, the basic term may have a null (e.g., zero) value, in which case the timing threshold defines a minimum quantity of symbols between a last symbol of the PDCCH scheduling the downlink transmission and a first symbol of the downlink transmission.

In some aspects, as described above, in cases of cross-carrier scheduling where the SCS on the first carrier associated with the PDCCH differs from the SCS on the second carrier associated with the downlink transmission scheduled by the PDCCH, the adjustment term may account for additional PDCCH processing time due to the difference in the slot durations associated with the first SCS and the second SCS. Accordingly, the adjustment term may have a null (e.g., zero) value in cases where the PDCCH self-schedules the downlink transmission (e.g., the PDCCH and the scheduled downlink transmission are on the same carrier) or in cases of cross-carrier scheduling where the scheduling cell and the scheduled cell have the same SCS. Additionally, or alternatively, the adjustment term may have a null value in cases of cross-carrier scheduling where the SCS of the first carrier associated with the PDCCH is higher than the SCS of the first carrier associated with the PDCCH (e.g., the first carrier has a 120 kHz SCS and the second carrier has a 15 kHz, 30 kHz, or 60 kHz SCS).

In cases where the adjustment term does not have a null value, the adjustment term for a PDSCH or an aperiodic CSI-RS may equal the minimum PDCCH-to-PDSCH delay that is defined for cross-carrier scheduling with different SCSs (e.g., as shown and described above with reference to FIG. 8C). For example, if the SCS on the first carrier associated with the PDCCH is 15 kHz, the adjustment term may be four symbols of a 15 kHz SCS. Alternatively, the adjustment term for a scheduled PDSCH may be equal to a number of symbols of a span of the PDCCH that is based on the SCS on the first carrier associated with the PDCCH (e.g., as shown and described above with reference to FIG. 8D). For example, if the PDCCH span pattern is (4,3), the adjustment term may be four symbols in a unit of the PDCCH symbol. Alternatively, in some aspects, the adjustment term for a PDSCH or an aperiodic CSI-RS may be a fixed quantity of symbols based on the PDCCH SCS, which may be determined from a set of valid numbers of symbols for a PDCCH span. For example, in some cases, the number of symbols for a PDCCH span can be 1, 2, or 3, whereby the adjustment term may have a value of 1, 2, or 3. In some aspects, the maximum value (e.g., 3) may be chosen to relax the timing requirement to a maximum extent.

In some aspects, when using the minimum PDCCH-to-PDSCH delay, the PDCCH span pattern, and/or the like to determine a timing threshold to be applied in cases of cross-carrier scheduling with different SCS, a scaling factor may be applied to convert the minimum PDCCH-to-PDSCH delay, the number of symbols in the PDCCH span, and/or the like to a quantity of symbols associated with the scheduled cell (where the PDSCH and/or aperiodic CSI-RS is to be received). For example, in some aspects, a scaling factor of $$\frac{2^{\mu_{PDSCH}}}{2^{\mu_{PDCCH}}}$$

may be applied to convert a minimum PDCCH-to-PDSCH delay or a number of symbols in the span of the PDCCH based on the SCS of the scheduling cell to a number of symbols based on the SCS of the scheduled cell. Additionally, or alternatively, a scaling factor $$\frac{2^{\mu_{CSIRS}}}{2^{\mu_{PDCCH}}}$$

may be applied to convert the minimum PDCCH-to-PDSCH delay or a number of symbols in the span of the PDCCH based on the SCS of the scheduling cell to the number of symbols based on the SCS of the scheduled cell. In these examples, $2^{\mu_{PDSCH}}$, $2^{\mu_{CSIRS}}$, $2^{\mu_{PDCCH}}$ may represent the SCS for the scheduled cell associated with the PDSCH, the scheduled cell associated with the aperiodic CSI-RS, and the scheduling cell associated with the PDCCH, where $\mu$ is [0,1,2,3] for SCS=[15,30,60,120] kHz.

Accordingly, as described herein, the UE may determine a value for the basic term and a value for the adjustment term using one or more of the techniques described above, and may sum the basic term and the adjustment term to determine the timing threshold. In some aspects, the UE may further quantize the timing threshold to a next slot boundary associated with the scheduled downlink transmission using the SCS of the second carrier on which the downlink transmission is scheduled. In some aspects, the UE may then determine how to process the downlink transmission based at least in part on the delay between the PDCCH and the scheduled downlink transmission and the timing threshold.

For example, in cases where the basic term of the timing threshold is based on a parameter defined for one or more of self-scheduling or cross-carrier scheduling where a scheduling cell and a scheduled cell have an equal SCS (e.g., a timeDurationForQCL for a PDSCH or beamSwitchTiming parameter for a CSI-RS), the UE may apply a QCL assumption indicated by the PDCCH to receive the scheduled downlink transmission as scheduled or triggered by the PDCCH if the delay between the PDCCH and the scheduled downlink transmission is greater than or equal to the timing threshold. Otherwise, in cases where the delay between the PDCCH and the scheduled downlink transmission is less than the timing threshold, the UE may apply a default QCL assumption to receive the scheduled downlink transmission based on one or more rules that are defined for cross-carrier scheduling with the same SCS. Alternatively, in cases where the basic term of the timing threshold has a null value and the scheduled downlink transmission is an aperiodic CSI-RS, the UE may receive and process the aperiodic CSI-RS if the delay between the PDCCH and the scheduled aperiodic CSI-RS is greater than or equal to the timing threshold. Otherwise, in cases where the delay between the PDCCH and the scheduled aperiodic CSI-RS is less than the timing threshold, the UE may not be required to process the CSI-RS. Accordingly, in such cases, the UE may attempt to receive and process the aperiodic CSI-RS, or the UE may ignore the transmission of the aperiodic CSI-RS.

As indicated above, FIG. 9 is provided as an example. Other examples may differ from what is described with respect to FIG. 9.

Figure 10:
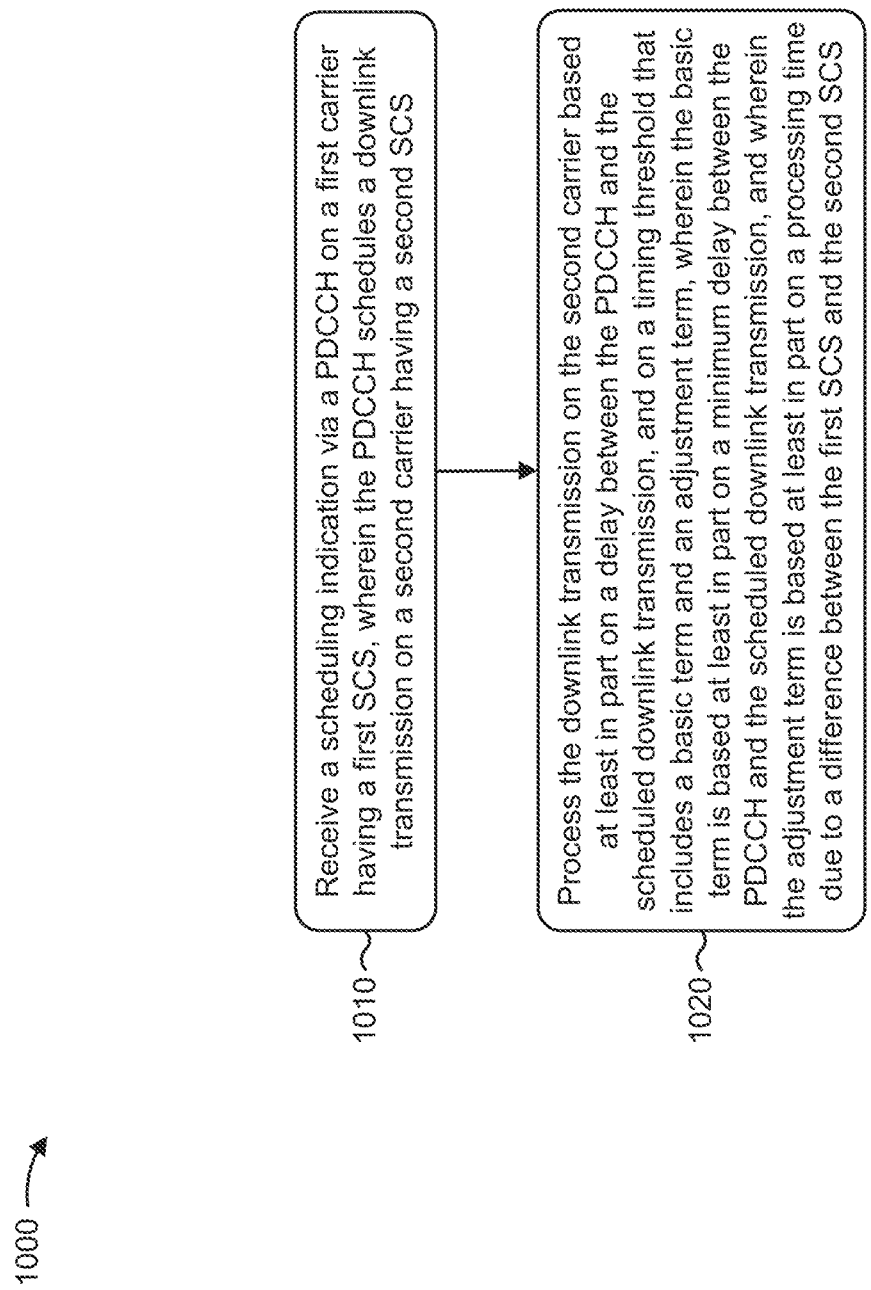
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with configuring a timing threshold for cross-carrier scheduling with different SCS. For example, as described herein, cross-carrier scheduling with different SCS may generally occur where a scheduling cell has a first SCS and a scheduled cell has a second SCS that differs from the first SCS.

As shown in FIG. 10, in some aspects, process 1000 may include receiving a scheduling indication via a PDCCH on a first carrier having a first SCS, wherein the PDCCH schedules a downlink transmission on a second carrier having a second SCS (block 1010). For example, the UE (e.g., using antenna 252, DEMOD 254, MIMO detector 256, receive processor 258, controller/processor 280, and/or the like) may receive a beam switch indication via a PDCCH on a first carrier having a first SCS, as described above. In some aspects, the PDCCH schedules a downlink transmission on a second carrier having a second SCS.

As further shown in FIG. 10, in some aspects, process 1000 may include processing the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission, and wherein the adjustment term is based at least in part on a processing time due to a difference between the first SCS and the second SCS (block 1020). For example, the UE (e.g., using antenna 252, DEMOD 254, MIMO detector 256, receive processor 258, controller/processor 280, and/or the like) may process the downlink transmission on the second carrier based at least in part on a delay between the PDCCH and the scheduled downlink transmission, and on a timing threshold that includes a basic term and an adjustment term, as described above. In some aspects, the basic term is based at least in part on a minimum delay between the PDCCH and the scheduled downlink transmission. In some aspects, the adjustment term is based at least in part on a processing time due to a difference between the first SCS and the second SCS.

Process 1000 may include additional aspects, such as any single aspect or any combination of aspects described below and/or in connection with one or more other processes described elsewhere herein.

In a first aspect, the timing threshold is a summation of the basic term and the adjustment term.

In a second aspect, alone or in combination with the first aspect, the basic term is based at least in part on a parameter defined for one or more of self-scheduling or cross-carrier scheduling where a scheduling cell and a scheduled cell have an equal SCS.

In a third aspect, alone or in combination with one or more of the first and second aspects, the basic term is based at least in part on a parameter (e.g., timeDurationForQCL) that defines a minimum quantity of symbols for the UE to receive the PDCCH and apply spatial QCL information received in DCI scheduling the downlink transmission.

In a fourth aspect, alone or in combination with one or more of the first through third aspects, the basic term is based at least in part on a parameter (e.g., beamSwitchTiming) that defines a minimum quantity of symbols between a last symbol of DCI scheduling the downlink transmission and a first symbol of the downlink transmission.

In a fifth aspect, alone or in combination with one or more of the first through fourth aspects, the basic term has a null value and the timing threshold defines a minimum quantity of symbols between a last symbol of the PDCCH scheduling the downlink transmission and a first symbol of the downlink transmission.

In a sixth aspect, alone or in combination with one or more of the first through fifth aspects, processing the downlink transmission includes applying a QCL assumption indicated by the PDCCH based at least in part on determining that the delay between the PDCCH and the scheduled downlink transmission is greater than or equal to the timing threshold, and receiving the scheduled downlink transmission based at least in part on the QCL assumption indicated by the PDCCH.

In a seventh aspect, alone or in combination with one or more of the first through sixth aspects, processing the downlink transmission includes receiving the scheduled downlink transmission based at least in part on determining that the delay between the PDCCH and the scheduled downlink transmission is greater than or equal to the timing threshold.

In an eighth aspect, alone or in combination with one or more of the first through seventh aspects, processing the downlink transmission includes applying a default QCL assumption based at least in part on determining that the delay between the PDCCH and the scheduled downlink transmission is less than the timing threshold, where the default QCL assumption is based at least in part on a rule associated with scheduling across carriers having an equal SCS or a rule associated with self-scheduling on a particular carrier, and receiving the scheduled downlink transmission based at least in part on the default QCL assumption.

In a ninth aspect, alone or in combination with one or more of the first through eighth aspects, processing the downlink transmission includes ignoring the scheduled downlink transmission based at least in part on determining that the delay between the PDCCH and the scheduled downlink transmission is less than the timing threshold.

In a tenth aspect, alone or in combination with one or more of the first through ninth aspects, the timing threshold and the delay between the PDCCH and the scheduled downlink transmission each include a quantity of symbols based at least in part on the second SCS associated with the second carrier.

In an eleventh aspect, alone or in combination with one or more of the first through tenth aspects, the scheduled downlink transmission includes one or more of a PDSCH or an aperiodic CSI-RS.

In a twelfth aspect, alone or in combination with one or more of the first through eleventh aspects, the basic term and the adjustment term have values that depend on whether the scheduled downlink transmission is the PDSCH or the aperiodic CSI-RS, and the values of the basic term and the adjustment term further depend on whether the scheduling indication indicates a beam switch operation.

In a thirteenth aspect, alone or in combination with one or more of the first through twelfth aspects, the adjustment term has a null value based at least in part on the PDCCH self-scheduling the downlink transmission, the first SCS equaling the second SCS, or the first SCS having a higher value than the second SCS.

In a fourteenth aspect, alone or in combination with one or more of the first through thirteenth aspects, the adjustment term includes a minimum PDCCH-to-PDSCH delay associated with the first SCS based at least in part on the first SCS having a lower value than the second SCS.

In a fifteenth aspect, alone or in combination with one or more of the first through fourteenth aspects, the adjustment term includes a minimum PDCCH-to-PDSCH delay associated with the first SCS based at least in part on the first SCS having a higher value than the second SCS.

In a sixteenth aspect, alone or in combination with one or more of the first through fifteenth aspects, process 1000 further includes applying a scaling factor to convert the minimum PDCCH-to-PDSCH delay associated with the first SCS to a quantity of symbols associated with the second SCS, where the scaling factor is based at least in part on the first SCS and the second SCS.

In a seventeenth aspect, alone or in combination with one or more of the first through sixteenth aspects, the adjustment term includes a quantity of symbols in a span duration associated with the PDCCH that is based at least in part on a PDCCH span pattern associated with the first SCS.

In an eighteenth aspect, alone or in combination with one or more of the first through seventeenth aspects, process 1000 further includes applying a scaling factor to convert the quantity of symbols in the span duration associated with the PDCCH to a quantity of symbols associated with the second SCS, where the scaling factor is based at least in part on the first SCS and the second SCS.

In a nineteenth aspect, alone or in combination with one or more of the first through eighteenth aspects, the adjustment term includes a quantity of symbols that is selected from a set of valid symbol quantities for a PDCCH span duration associated with the first SCS.

In a twentieth aspect, alone or in combination with one or more of the first through nineteenth aspects, the quantity of symbols selected for the adjustment term is a maximum quantity of symbols in the set of valid symbol quantities for the PDCCH span duration associated with the first SCS.

In a twenty-first aspect, alone or in combination with one or more of the first through twentieth aspects, process 1000 further includes applying a scaling factor to convert the quantity of symbols selected for the adjustment term to a quantity of symbols associated with the second SCS, where the scaling factor is based at least in part on the first SCS and the second SCS.

In a twenty-second aspect, alone or in combination with one or more of the first through twenty-first aspects, process 1000 further includes quantizing the timing threshold to a next slot boundary for the scheduled downlink transmission based at least in part on the second SCS associated with the second carrier on which the downlink transmission is scheduled.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a scheduling indication via a physical downlink control channel (PDCCH) on a first carrier having a first subcarrier spacing (SCS), wherein the PDCCH schedules a downlink transmission on a second carrier having a second SCS; and
processing the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission and further based at least in part on whether the downlink transmission is a physical downlink shared channel (PDSCH) or an aperiodic channel state information reference signal (CSI-RS), and wherein the adjustment term is based at least in part on a processing time due to a difference between the first SCS and the second SCS.

2. The method of claim 1, wherein the basic term is based at least in part on a parameter defined for one or more of self-scheduling or cross-carrier scheduling where a scheduling cell and a scheduled cell have an equal SCS.

3. The method of claim 2, wherein the parameter defines a minimum quantity of symbols for the UE to receive the PDCCH and apply spatial quasi-co-location information received in downlink control information scheduling the downlink transmission.

4. The method of claim 2, wherein the parameter defines a minimum quantity of symbols between a last symbol of downlink control information scheduling the downlink transmission and a first symbol of the downlink transmission.

5. The method of claim 1, wherein the basic term has a null value and the timing threshold defines a minimum quantity of symbols between a last symbol of the PDCCH scheduling the downlink transmission and a first symbol of the downlink transmission.

6. The method of claim 1, wherein processing the downlink transmission includes:
applying a quasi-co-location (QCL) assumption indicated by the PDCCH based at least in part on determining that the delay between the PDCCH and the scheduled downlink transmission is greater than or equal to the timing threshold; and
receiving the scheduled downlink transmission based at least in part on the QCL assumption indicated by the PDCCH.

7. The method of claim 1, wherein processing the downlink transmission includes receiving the scheduled downlink transmission based at least in part on determining that the delay between the PDCCH and the scheduled downlink transmission is greater than or equal to the timing threshold.

8. The method of claim 1, wherein processing the downlink transmission includes:
applying a default quasi-co-location (QCL) assumption based at least in part on determining that the delay between the PDCCH and the scheduled downlink transmission is less than the timing threshold, wherein the default QCL assumption is based at least in part on a rule associated with scheduling across carriers having an equal SCS or a rule associated with self-scheduling on a particular carrier; and
receiving the scheduled downlink transmission based at least in part on the default QCL assumption.

9. The method of claim 1, wherein processing the downlink transmission includes ignoring the scheduled downlink transmission based at least in part on determining that the delay between the PDCCH and the scheduled downlink transmission is less than the timing threshold.

10. The method of claim 1, wherein the timing threshold and the delay between the PDCCH and the scheduled downlink transmission each include a quantity of symbols based at least in part on the second SCS associated with the second carrier.

11. The method of claim 1, wherein the adjustment term is further based at least in part on whether the downlink transmission is the PDSCH or the aperiodic CSI-RS.

12. The method of claim 11, wherein the basic term and the adjustment term have values that depend on whether the scheduled downlink transmission is the PDSCH or the aperiodic CSI-RS, and wherein the values of the basic term and the adjustment term further depend on whether the scheduling indication indicates a beam switch operation.

13. The method of claim 1, wherein the adjustment term has a null value based at least in part on the PDCCH self-scheduling the downlink transmission, the first SCS equaling the second SCS, or the first SCS having a higher value than the second SCS.

14. The method of claim 1, wherein the adjustment term includes a minimum PDCCH-to-PDSCH delay associated with the first SCS based at least in part on the first SCS having a lower value than the second SCS.

15. The method of claim 1, wherein the adjustment term includes a minimum PDCCH-to-PDSCH delay associated with the first SCS based at least in part on the first SCS having a higher value than the second SCS.

16. The method of claim 15, further comprising:
applying a scaling factor to convert the minimum PDCCH-to-PDSCH delay associated with the first SCS to a quantity of symbols associated with the second SCS, wherein the scaling factor is based at least in part on the first SCS and the second SCS.

17. A user equipment (UE) for wireless communication, comprising:
a memory; and
one or more processors coupled to the memory, the one or more processors configured to:

receive a scheduling indication via a physical downlink control channel (PDCCH) on a first carrier having a first subcarrier spacing (SCS), wherein the PDCCH schedules a downlink transmission on a second carrier having a second SCS; and process the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission and further based at least in part on whether the downlink transmission is a physical downlink shared channel (PDSCH) or an aperiodic channel state information reference signal (CSI-RS), and wherein the adjustment term is based at least in part on a processing time due to a difference between the first SCS and the second SCS.

18. The UE of claim 17, wherein the basic term is based at least in part on a parameter defined for one or more of self-scheduling or cross-carrier scheduling where a scheduling cell and a scheduled cell have an equal SCS.

19. The UE of claim 17, wherein the basic term has a null value and the timing threshold defines a minimum quantity of symbols between a last symbol of the PDCCH scheduling the downlink transmission and a first symbol of the downlink transmission.

20. The UE of claim 17, wherein and the one or more processors, to process the downlink transmission, are further configured to:
apply a quasi-co-location (QCL) assumption indicated by the PDCCH based at least in part on determining that the delay between the PDCCH and the scheduled downlink transmission is greater than or equal to the timing threshold; and
receive the scheduled downlink transmission based at least in part on the QCL assumption indicated by the PDCCH.

21. The UE of claim 17, wherein the one or more processors, to process the downlink transmission, are further configured to receive the scheduled downlink transmission based at least in part on determining that the delay between the PDCCH and the scheduled downlink transmission is greater than or equal to the timing threshold.

22. The UE of claim 17, wherein the one or more processors, to process the downlink transmission, are further configured to:
apply a default quasi-co-location (QCL) assumption based at least in part on determining that the delay between the PDCCH and the scheduled downlink transmission is less than the timing threshold, wherein the default QCL assumption is based at least in part on a rule associated with scheduling across carriers having an equal SCS or a rule associated with self-scheduling on a particular carrier; and
receive the scheduled downlink transmission based at least in part on the default QCL assumption.

23. The UE of claim 17, wherein the one or more processors, to process the downlink transmission, are further configured to ignore the scheduled downlink transmission based at least in part on determining that the delay between the PDCCH and the scheduled downlink transmission is less than the timing threshold.

24. The UE of claim 17, wherein the timing threshold and the delay between the PDCCH and the scheduled downlink transmission each include a quantity of symbols based at least in part on the second SCS associated with the second carrier.

25. The UE of claim 17, wherein the adjustment term has a null value based at least in part on the PDCCH self-scheduling the downlink transmission, the first SCS equaling the second SCS, or the first SCS having a higher value than the second SCS.

26. The UE of claim 17, wherein the adjustment term includes a minimum PDCCH-to-PDSCH delay associated with the first SCS based at least in part on the first SCS having a lower value than the second SCS.

27. The UE of claim 17, wherein the adjustment term includes a minimum PDCCH-to-PDSCH delay associated with the first SCS based at least in part on the first SCS having a higher value than the second SCS.

28. The UE of claim 17, wherein the adjustment term is further based at least in part on whether the downlink transmission is the PDSCH or the aperiodic CSI-RS.

29. A non-transitory computer-readable medium storing one or more instructions for wireless communication, the one or more instructions comprising:
one or more instructions that, when executed by one or more processors of a user equipment (UE), cause the one or more processors to:
receive a scheduling indication via a physical downlink control channel (PDCCH) on a first carrier having a first subcarrier spacing (SCS), wherein the PDCCH schedules a downlink transmission on a second carrier having a second SCS; and
process the downlink transmission on the second carrier based at least in part on a delay between the PDCCH and the scheduled downlink transmission, and on a timing threshold that includes a basic term and an adjustment term and further based at least in part on whether the downlink transmission is a physical downlink shared channel (PDSCH) or an aperiodic channel state information reference signal (CSI-RS), wherein the basic term is based at least in part on a minimum delay between the PDCCH and the scheduled downlink transmission, and wherein the adjustment term is based at least in part on a processing time due to a difference between the first SCS and the second SCS.

30. An apparatus for wireless communication, comprising:
means for receiving a scheduling indication via a physical downlink control channel (PDCCH) on a first carrier having a first subcarrier spacing (SCS), wherein the PDCCH schedules a downlink transmission on a second carrier having a second SCS; and
means for processing the downlink transmission on the second carrier based at least in part on a delay between the PDCCH and the scheduled downlink transmission, and on a timing threshold that includes a basic term and an adjustment term, wherein the basic term is based at least in part on a minimum delay between the PDCCH and the scheduled downlink transmission and further based at least in part on whether the downlink transmission is a physical downlink shared channel (PDSCH) or an aperiodic channel state information reference signal (CSI-RS), and wherein the adjustment term is based at least in part on a processing time due to a difference between the first SCS and the second SCS.

* * * * *